United States Patent
Guskov et al.

(10) Patent No.: US 8,390,623 B1
(45) Date of Patent: Mar. 5, 2013

(54) PROXY BASED APPROACH FOR GENERATION OF LEVEL OF DETAIL

(75) Inventors: Igor Guskov, Ann Arbor, MI (US); Emil C. Praun, Fremont, CA (US); Paul Strauss, Sunnyvale, CA (US); Costa Touma, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 999 days.

(21) Appl. No.: 12/421,978

(22) Filed: Apr. 10, 2009

Related U.S. Application Data

(60) Provisional application No. 61/044,865, filed on Apr. 14, 2008.

(51) Int. Cl.
*G06T 17/00* (2006.01)

(52) U.S. Cl. ......... 345/428; 345/419; 345/581; 345/582

(58) Field of Classification Search .............. 345/419, 345/428, 581, 582
See application file for complete search history.

(56) References Cited

U.S. PATENT DOCUMENTS

| | | | |
|---|---|---|---|
| 2006/0210146 A1* | 9/2006 | Gu | 382/154 |
| 2006/0284834 A1* | 12/2006 | Itkowitz et al. | 345/156 |
| 2007/0043442 A1* | 2/2007 | Abernathie et al. | 623/17.11 |
| 2007/0265815 A1* | 11/2007 | Couet et al. | 703/10 |

OTHER PUBLICATIONS

Barbara Cutler, and Emily Whiting, "Constrained Planar Remeshing for Architecture", May 28-30, 2007, CHCCS/SCDHM, Grahpics Interface Conference 2007, pp. 11-18.*

* cited by examiner

*Primary Examiner* — Kimbinh T Nguyen
(74) *Attorney, Agent, or Firm* — Marshall, Gerstein & Borun LLP

(57) ABSTRACT

A proxy based approach for generation of level of detail. In an embodiment, the present invention generates level of detail using a proxy based approach by (1) receiving a three dimensional polygon mesh with textures; (2) extracting a set of masking primitives above a first threshold from the three dimensional polygon mesh; (3) calculating a set of proxy planes, where the calculation includes associating each proxy plane with at least one of the masking primitives; and (4) optimizing the set of proxy planes.

25 Claims, 9 Drawing Sheets

PROXY BASED APPROACH FOR GENERATION OF LEVEL OF DETAIL

FIELD OF THE INVENTION

The present invention relates to three dimensional graphics.

BACKGROUND OF THE INVENTION

Three dimensional graphics can be complex. Increased complexity can increase the time it takes to render an object in a three dimensional environment. This problem may be exacerbated if the three dimensional graphics data is being requested from a remote location. However, some complexity issues can be mitigated based on how objects in the three dimensional environment are viewed. For example, objects that appear far away can be decreased in complexity since any reduced resolution may be unnoticeable. Techniques that employ these characteristics are said to account for level of detail (LOD).

However, in some instances, even this reduced complexity may not be enough to sufficiently decrease rendering time. This may be especially true in instances where large amounts of objects need to be rendered in a short amount of time. A reason for this is that many graphics engines must connect the vertices of each object in order to render the objects, with the objects having a high number of vertices even at a reduced state of complexity.

What are needed are techniques that allow for many objects to be rendered quickly without the limitations discussed above.

BRIEF SUMMARY

This invention relates to three dimensional graphics. A system embodiment of this invention generates level of detail using a proxy based approach. A system embodiment includes a masking primitive extractor, a proxy plane calculator, and a proxy plane optimizer. The masking primitive extractor receives a three dimensional polygon mesh with textures, and extracts a set of masking primitives above a first threshold from the three dimensional polygon mesh. The proxy plane calculator calculates a set of proxy planes, where each proxy plane is associated with at least one of the masking primitives. The proxy plane optimizer optimizes the set of proxy planes. In a further embodiment, the system also includes a scene renderer. The scene renderer renders a scene onto each proxy plane, where the scenes are based on the masking primitives associated with the respective proxy plane.

A method embodiment of this invention generates level of detail using a proxy based approach. The method embodiment includes receiving a three dimensional polygon mesh with textures, extracting a set of masking primitives above a first threshold from the three dimensional polygon mesh, calculating a set of proxy planes, where each proxy plane is associated with at least one of the masking primitives, and optimizing the set of proxy planes. In a further embodiment, the method also includes rendering a scene onto each proxy plane, where the scenes are based on the masking primitives associated with the respective proxy plane. The textures, together with the resulting proxy planes, are used as a coarse LOD model.

Using these coarse LOD models, a large number of three dimensional objects may be rendered more quickly and efficiently, despite data being transmitted over a network. The task of connecting vertices is avoided, and each object is optimized to reduce the number of proxy planes that are necessary to render the object.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

The present invention relates to three dimensional graphics. This can include a proxy based approach for generation of level of detail. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe a system and method for generating level of detail using a proxy based approach in greater detail.

System

Figure 1:
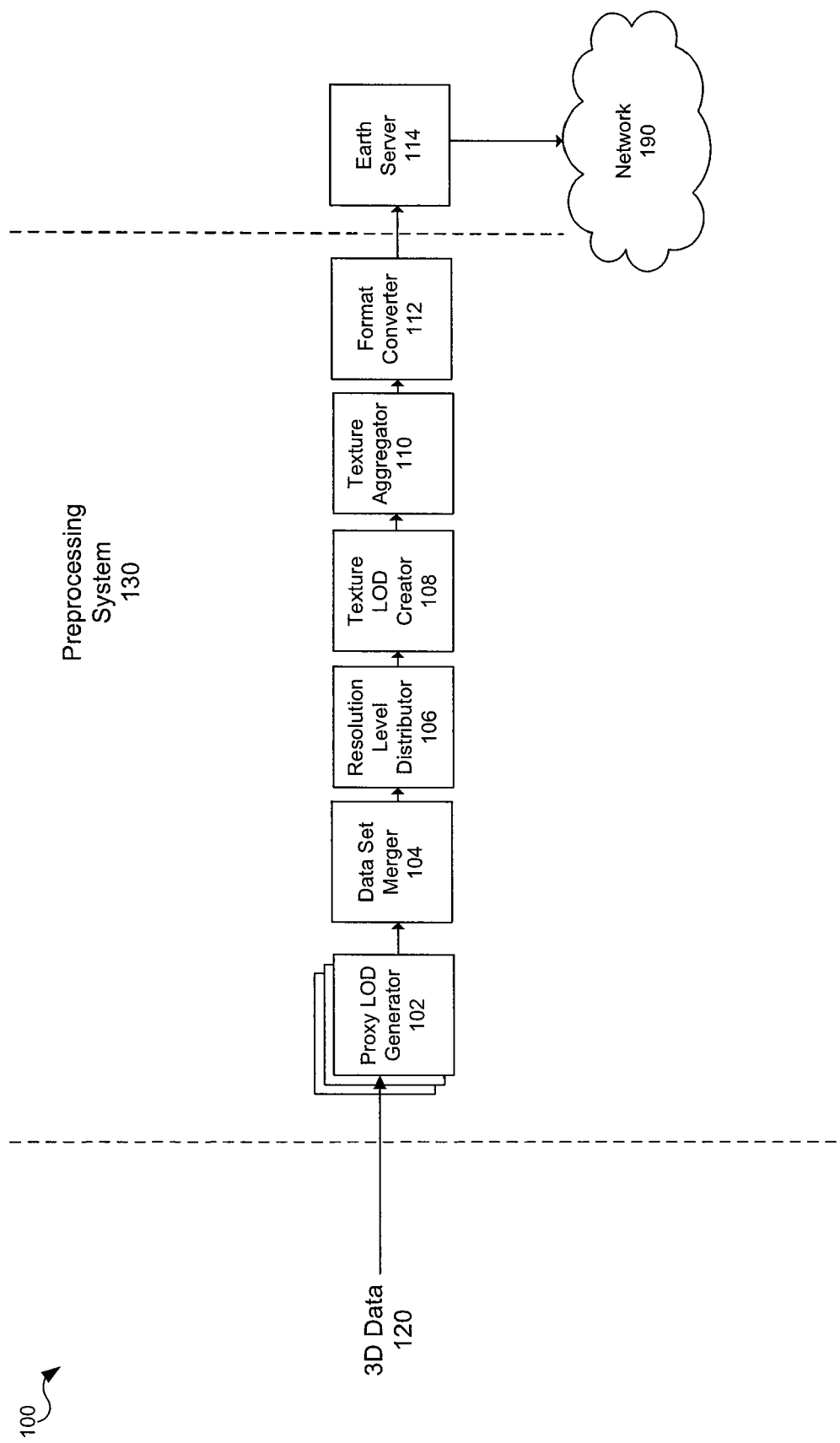
FIG. 1 is a diagram of a system suitable for generating level of detail using a proxy based approach according to an embodiment of the present invention.

This section describes a system suitable for generating level of detail using a proxy based approach. FIG. 1 is an architecture diagram of system 100 for generating level of detail using a proxy based approach according to an embodiment of the present invention. System 100 includes a preprocessing system 130. Preprocessing system 130 further includes a proxy level of detail (LOD) generator 102, a data set merger 104, a resolution level distributor 106, a texture LOD creator 108, a texture aggregator 110, and a format converter 112. Preprocessing system 130 may be coupled to an earth server 114. Preprocessing system 130 may communicate with network 190 through earth server 114. In further embodiment, preprocessing system 130 can also be coupled directly to network 190 through connections not shown for clarity.

In an embodiment, preprocessing system 130 (and its components including a proxy level of detail (LOD) generator 102, a data set merger 104, a resolution level distributor 106, a texture LOD creator 108, a texture aggregator 110, and a format converter 112) can include pipelined processing or other processing arrangements to carry out its tasks as would be apparent to a person skilled in the art given this description.

Preprocessing system 130 may be implemented on a computing device. Such a computing device can include, but is not limited to, a personal computer, mobile device such as a mobile phone, workstation, embedded system, game console, television, or set-top box. Such a computing device may include, but is not limited to, a device having one or more processors and memory for executing and storing instructions. Such a computing device may include software, firmware, hardware, or a combination thereof. Software may include one or more applications and an operating system. Hardware can include, but is not limited to, a processor, memory and graphical user interface display. Preprocessing system 130 can also be implemented on a plurality of computing devices.

Network 190 may be any type of network or combination of networks that can carry data communication. Such network 190 can include, but is not limited to, a local area network, medium area network and/or wide area network such as the Internet. Network 190 may be in a form of a wired network or a wireless network. Network 190 can support protocols and technology including, but not limited to, World Wide Web protocols and/or services. Intermediate web servers, gateways, or other servers may be provided between components of system 100 depending upon a particular application or environment. In an embodiment, earth server 114 may communicate over network 190.

Proxy LOD generator 102 receives three dimensional data 120. Three dimensional data 120 may include image data from various sources, including, but not limited to, LIDAR (Light Detection and Ranging) imagery, user contributed data, topographic data, and street and aerial imagery. In an embodiment, proxy LOD generator 102 uses three dimensional data 120 to generate proxy LODs. The generation of proxy LODs is further discussed below with respect to FIGS. 3-8B.

Data set merger 104 merges textures associated with three dimensional data 120 obtained from a plurality of sources into one or more data sets.

Resolution level distributor 106 may distribute the one or more objects of interest included in the datasets obtained from data set merger 104 and the proxy LODs generated by proxy LOD generator 102 to various resolution levels of a geo-spatial quadtree.

Texture LOD creator 108 generates a resolution pyramid for each texture used by the objects of interest. In an embodiment, texture LOD creator 108 may store each texture having a certain resolution at a node of the geo-spatial quadtree, where the resolution of a texture level as applied to an object of interest approximately corresponds to the resolution of the quadtree node where it is stored. For example, the resolution of the texture level as applied to the object of interest may be 1 meter per pixel and the resolution of the quadtree node where it is stored may be 0.6 meters per pixel.

Texture aggregator 110 aggregates a plurality of textures at multiple resolutions, creating several texture trees or a forest. Each texture tree is associated with a set of objects (for example, buildings) made up of triangles (corresponding to façades, roofs, etc). In an embodiment, texture aggregator 110 may store each texture having a certain resolution at a node of a multi-resolution spatial data structure organizing the objects of interest. The multi-resolution spatial data structure may be, for example, a quadtree. Textures having the same resolution when applied to an object of interest may share a common level in the quadtree.

Each node in a texture tree represents an aggregated atlas texture at a given resolution. The texture at the given resolution can have zero or more children, containing textures at double the resolution in each of the two texture dimensions. Such child textures can replace a rectangular sub-region of a parent node texture. In an embodiment, the sub-regions corresponding to different child nodes do not overlap.

In an embodiment, the objects of interest using textures from a given LOD tree in the forest are stored at the same geo-spatial quadtree node where the root of the texture is also stored.

Format converter 112 may convert the textures aggregated by texture aggregator 110 into a format used by earth server 114 to transmit the textures over network 190. As an example, format converter 112 may convert textures to the JPEG 2000 image format. JPEG 2000 is an image compression standard known to those skilled in the art.

Earth server 114 may transmit both textures and three dimensional geometries over network 190. At run time, for example, earth server 114 may fulfill requests made by client 210. In one exemplary embodiment, earth server 114 may include a web server or may be coupled to communicate with a web server at the same or a different location. A web server is a software component that responds to a hypertext transfer protocol (HTTP) request with an HTTP response. As illustrative examples, the web server may be, without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include hypertext markup language (HTML), extensible markup language (XML), documents, videos, images, multimedia features, or any combination thereof. This example is strictly illustrative and does not limit the present invention.

In an embodiment, client 210 processes a texture forest generated by preprocessing system 130 and transmitted in part by earth server 114 over network 190. Client 210 may choose which texture resolution to use when rendering a part of an object of interest and use the same single set of texture coordinates for all possible resolutions of that texture in the texture tree. Pre-vertex texture coordinates need not be computed at each resolution level while traversing the texture tree.

In an embodiment, the nodes of texture trees may be associated with the nodes of a spatial structure, such as, for example, a quadtree. Since it may be impractical to transmit the whole texture forest over a network to a client, such as from network 190 to client 210, the client can use the geo-spatial quadtree to decide what parts of the forest to fetch. In other words, the client may only download the parts of the forest that may be needed to render the scene currently in view.

Figure 2:
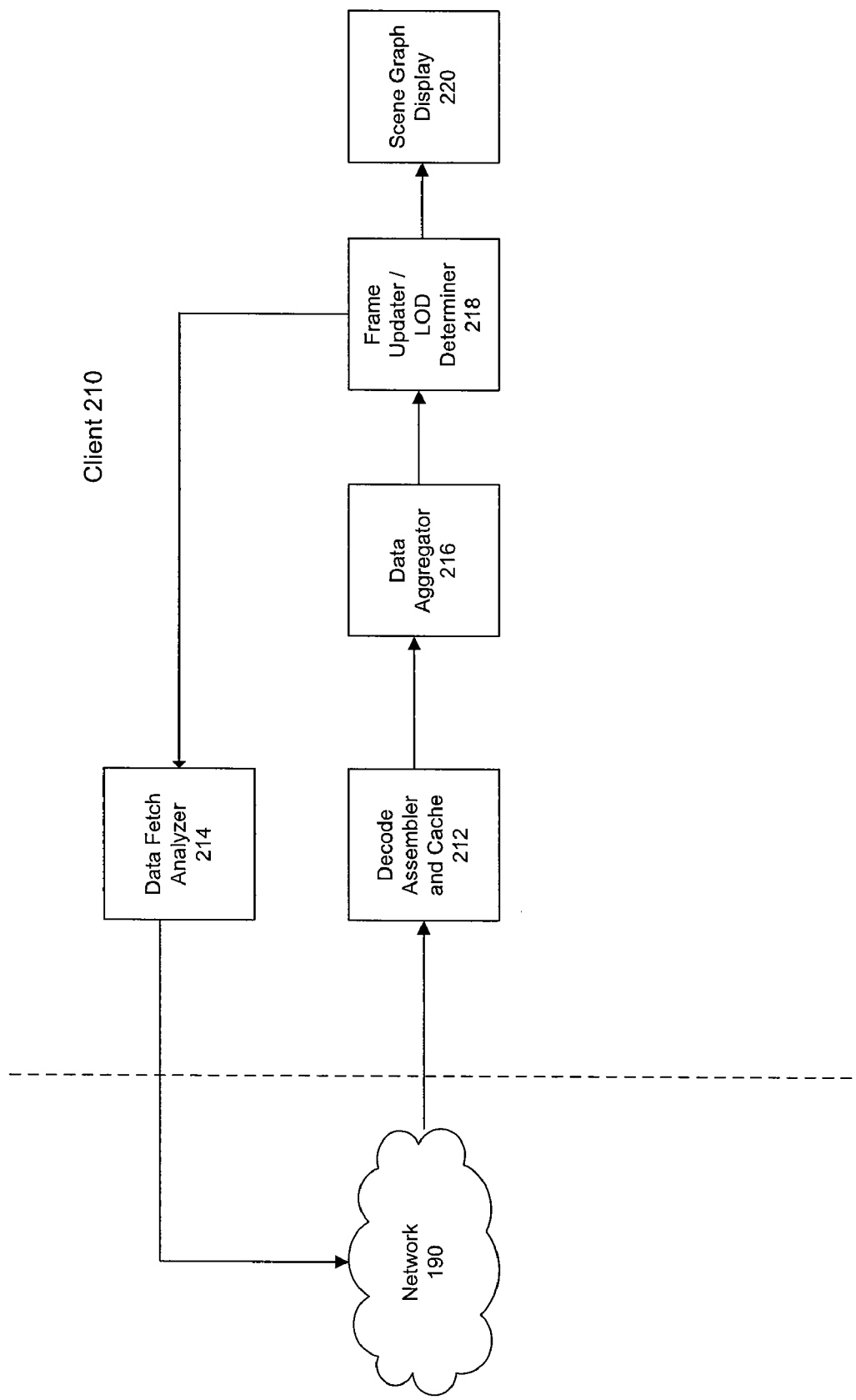
FIG. 2 is a diagram of a system that receives results of the components of the system in FIG. 1, according to an embodiment of the present invention.

FIG. 2 illustrates client 210 according to an embodiment of the present invention. Client 210 includes a decode assembler and cache 212, a data fetch analyzer 214, a data aggregator 216, a frame updater/LOD determiner 218, and a scene graph display 220.

In an embodiment, preprocessing system 130 transmits data over network 190. Data transmitted by preprocessing system 130 over network 190 may be received by client 210.

Client 210 may be implemented on a computing device. Such a computing device can include, but is not limited to, a personal computer, mobile device such as a mobile phone, workstation, embedded system, game console, television, or set-top box. Such a computing device may include, but is not limited to, a device having one or more processors and memory for executing and storing instructions. Such a computing device may include software, firmware, hardware, or a combination thereof. Software may include one or more applications and an operating system. Hardware can include, but is not limited to, a processor, memory and graphical user interface display. Client 210 may also be implemented across multiple computing devices.

In an embodiment, decode assembler and cache 212 receives data from network 190. As an example, this data may comprise three dimensional data relating to geometries of various objects of interest in a scene. Furthermore, data may comprise image data in highly compressed formats, such as, for example, the JPEG 2000 format. As an example, decode assembler and cache 212 may convert the data from a received format to another format that may be less efficiently compressed, but more suitable for direct rendering by client 210. Additionally decode assembler and cache 212 may assemble and store the decoded data into data sets that may be used by client 210 for further processing.

Data fetch analyzer 214 processes each node of the geospatial quadtree that intersects the current view to be rendered by client 210 and whose resolution is not too detailed for the current view. Data fetch analyzer 214 downloads metadata for these quadtree nodes from earth server 114. The quadtree node metadata may indicate that the quadtree nodes contain geometric objects or textures, which are then downloaded.

Data aggregator 216 may receive a plurality of data sets that includes texture and geometry data relating to objects of interest and other objects in a scene. Data aggregator 216 may then aggregate the data sets before they are provided to frame updater/LOD determiner 218. As an example, data aggregator 216 may further aggregate textures and geometric objects using the same texture trees described above. Aggregation of various data sets may improve efficiency of client 210.

Similar to textures having multiple resolution levels organized in a tree, geometric objects may have multiple, progressively more complicated representations organized in LOD trees. For example, coarse representations of objects may be generated preprocessing system 130 by proxy LOD generator 102. Frame updater/LOD determiner 218 processes a plurality of geometry LOD trees and texture trees received from data aggregator 216. In an embodiment, frame updater/LOD determiner 218 may determine LODs for all geometry and texture objects and update LODs that have been determined.

In an embodiment, a scene graph may be considered a representation that includes information about the geometry and appearance of all objects appearing on a graphical display. As an example, a scene graph may be a dynamic data structure within a computer program. A scene graph may include data that describes shape objects (geometry and appearance), geometric structure relationships (geometric transformations, ordering, and grouping), global objects (how all shape objects are viewed, e.g. viewpoints, lights, backgrounds), and behaviors (procedures for modifying information stored in a scene graph).

As an example, not intended to limit the invention, a scene graph is implemented using object-oriented computer programming techniques. Thus, scene graph objects can be provided as object-oriented software objects, which may describe shape objects. For example, a scene graph can include a software object associated with an building image, and a scene graph display command can operate on the building object to render the building image on a graphical display.

Objects of a scene graph, for example, may be generated using software commands, for example a "create" command. The objects of a scene graph are operated upon using other commands, for example a "render" command, which causes an object to appear as an image on a video screen. Therefore, the scene graph, including the objects, is associated with a set of scene graph display commands.

A scene graph can be represented diagrammatically as a tree structure having "nodes" and interconnecting lines or "arcs." The scene graph data structure described above underlies the tree structure representation. The scene graph can also be associated with a sequence of display commands, which can be used to generate the underlying data structure of the scene graph.

It should be understood that a scene graph can be associated with more scene graph display commands than actually are used to generate images on a graphical display. For example, a scene graph can be associated with a set of "create" commands that represent scene graph objects, and not every object necessarily has a corresponding "render" command that generates an image on the graphical display.

Various high-level software application programmer interfaces (APIs) have been established to create a scene graph when presented with the scene graph display commands. For example Java3D and VRML provide high-level software to generate a scene graph. Lower level APIs have also been provided, including Open GL, and Direct 3D. Application software, for example computer games, has been developed to provide the scene graph display command to an API.

In an embodiment, a scene graph generated and updated by frame updater/LOD determiner 218 may be provided to scene graph display 220. Scene graph display 220 renders a scene graph for display so that a scene may be viewed by a user of client 210.

As an example, scene graph display 220 may be associated with a 3D graphics circuit board having local processing capability, and the ability to interpret scene graph data and rapidly provide a corresponding graphical display on a monitor.

Exemplary scene graph programming techniques, in conjunction with the 3D graphic circuit board, provide the ability to rapidly render a 3D image on a graphical display. Images on the graphical display can also be rapidly updated with one or more display commands, provided by the application software, interpreted by the API, and sent to the 3D graphics circuit board.

Figure 3:
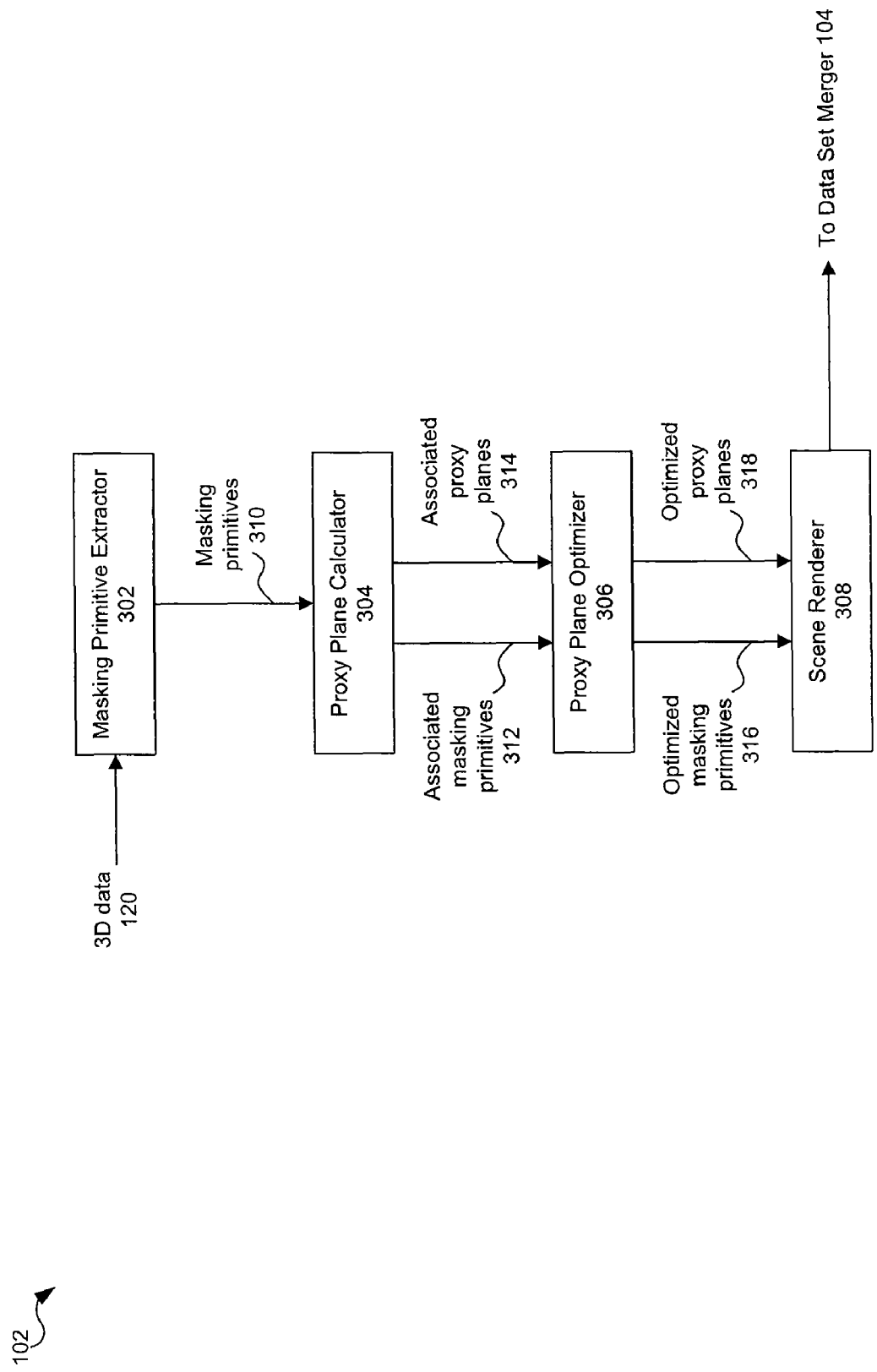
FIG. 3 is a diagram of a proxy level of detail generator according to an embodiment of the present invention.

FIG. 3 is a diagram of proxy LOD generator 102 according to an embodiment of the present invention. As shown in FIG. 3, proxy LOD generator 102 includes a masking primitive extractor 302, a proxy plane calculator 304, a proxy plane optimizer 306, and a scene renderer 308.

Masking primitive extractor 302 takes three dimensional data 120 that includes polygon mesh with textures and extracts a set of masking primitives. In an embodiment, the polygon mesh can be a mesh made up of polygons including but not limited to triangles. In the case of a triangular mesh, the masking primitives are triangles. As described herein, the set of masking primitives will be referred to as the set of triangles. However, as can be seen by one of ordinary skill in the art, the masking primitives may be of any shape.

In an embodiment, only those triangles whose area is above a certain threshold are included in the extracted set of triangles. The threshold may be set such that tiny or zero-area triangles can be excluded from the set, reducing unnecessary computations in the future. Once the set of triangles have been extracted from three dimensional data 120, the set is sent to proxy plane calculator 304 in the form of masking primitives 310.

Proxy plane calculator 304 calculates a set of proxy planes based on received masking primitives 310. Proxy planes may be two dimensional objects and rectangular in shape. In an embodiment, textures are mapped onto proxy planes and the proxy planes are combined to form three dimensional objects, such as, for example, buildings. Proxy planes, and their RGBA textures, combined to form three dimensional objects are also known as proxy cloud LOD models. Each triangle in masking primitives 310 is associated with at least one of the calculated proxy planes, and proxy plane calculator 304 sends both associated masking primitives 312 and associated proxy planes 314 to proxy plane optimizer 306. Proxy plane calculator 304 is described in greater detail below with respect to FIG. 4.

Proxy plane optimizer 306 optimizes the proxy planes received in associated proxy planes 314 using the triangles in associated masking primitives 312. In an example, a goal of proxy plane optimizer 306 is to find the fewest proxy planes that can approximate the proxy cloud LOD model. In another example, proxy plane optimizer 306 finds a fewer number of proxy planes than initially calculated that can approximate the proxy cloud LOD model. Such optimization may result in a new set of proxy planes, with some or all of the triangles now being associated with a new proxy plane. These results are sent to scene renderer 308 in the form of optimized masking primitives 316 and optimized proxy planes 318. Proxy plane optimizer 306 is described in greater detail below with respect to FIG. 5.

Scene renderer 308 renders proxy textures onto each of the proxy planes included in optimized proxy planes 318. In an embodiment, this is completed by first initializing an axis-aligned planar quad and rendering a mask at a given resolution for each proxy plane. The mask consists of those triangles that are associated with the given proxy plane and forms an RGBA image scene, meaning it has both color and transparency channels. The axis-aligned planar quad is then adjusted to improve the fit to the rendered mask and to minimize the area of transparent pixels. This adjustment may be performed by rotating the principal axes of the planar quad within the previously computed proxy plane, thus performing a minimization of the empty texture space with respect to the rotation angle.

Once adjusted, the mask containing the image scene, now known as a proxy texture, is rendered into the given proxy plane using a projection technique, such as, for example, orthographic projection viewing volume. If orthographic projection viewing volume is used, then the size of the scene is independent of its position. The size of the scene in the X and Y directions may then be given by the adjusted planar quad, while the size of the scene in the Z direction may be determined by an error value of the given proxy plane. Note that the X and Y directions are in eye coordinates of the orthographic camera, and the Z direction is a depth and orthogonal to the proxy plane. Error values of proxy planes are described in greater detail below. Once a mask has been rendered into each proxy plane, the proxy planes can be combined to form one or more three dimensional proxy cloud LOD models. The results are passed on to data set merger 104.

Each of masking primitive extractor 302, proxy plane calculator 304, proxy plane optimizer 306, and scene renderer 308 may be implemented as software, hardware, firmware, or any combination thereof.

Figure 4:
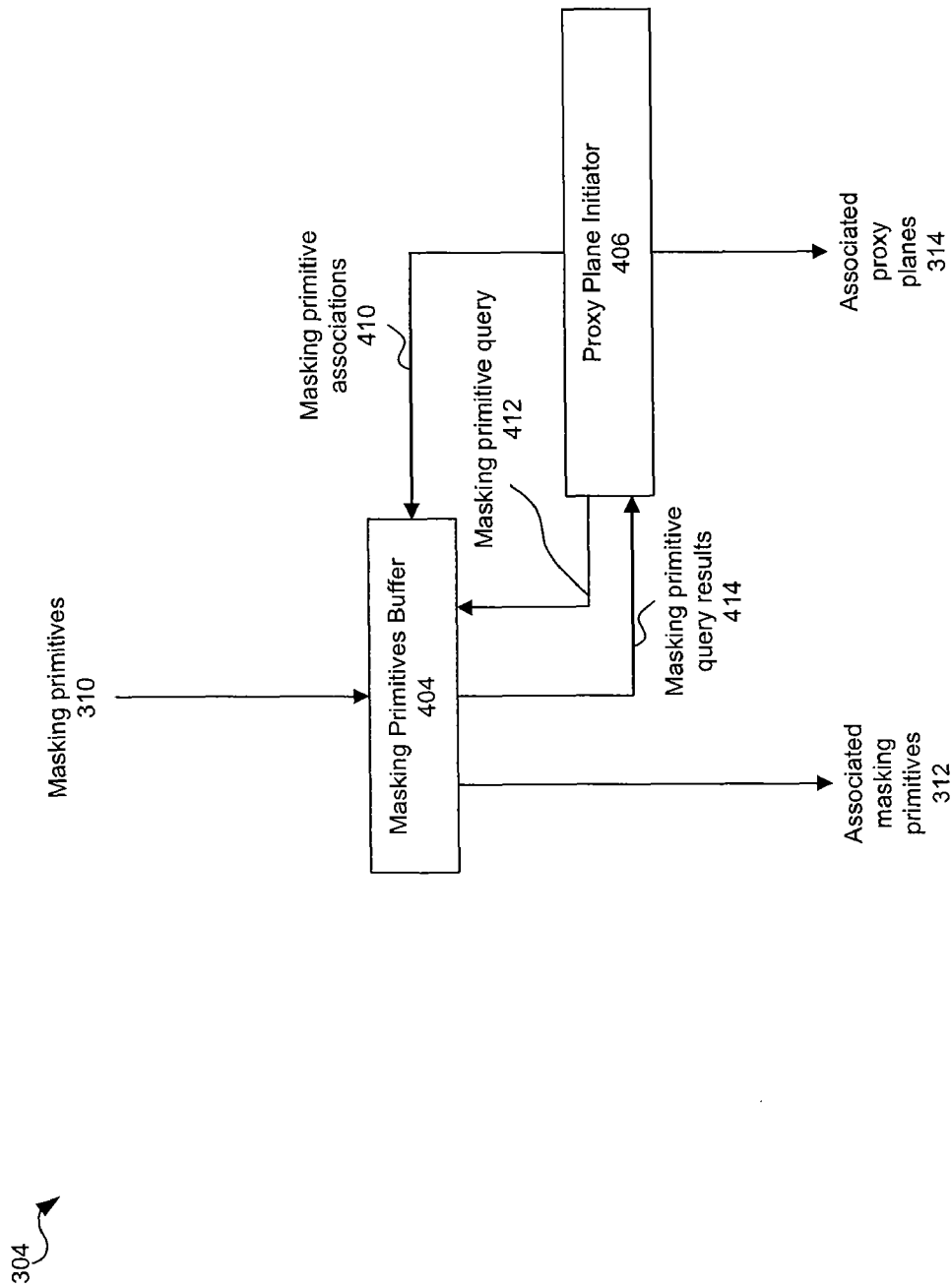
FIGS. 4-5 are more detailed diagrams of the proxy level of detail generator according to an embodiment of the present invention.
Figure 5:
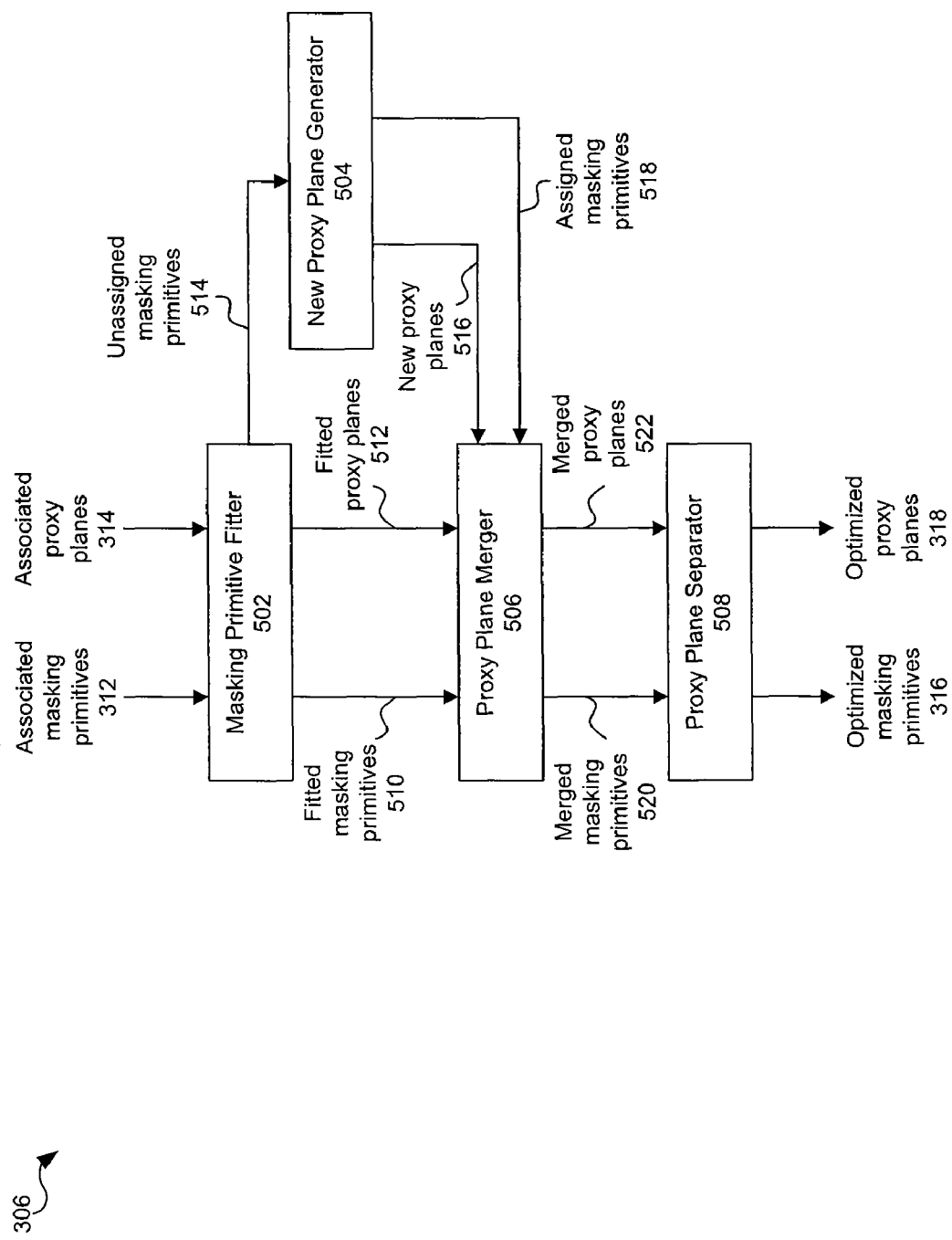

FIGS. 4-5 are more detailed diagrams of proxy LOD generator 102 according to an embodiment of the present invention. Specifically, FIG. 4 is a more detailed diagram of proxy plane calculator 304. As shown in FIG. 4, proxy plane calculator 304 includes a masking primitives buffer 404 and a proxy plane initiator 406.

In an embodiment, a set of proxy planes can be associated with the triangles in masking primitives 310 if the triangles are within a certain distance of the set of proxy planes. More precisely, given an error value E, a triangle can be associated with a proxy plane if the distance from any point on the triangle to the proxy plane is within $\epsilon$.

Masking primitives buffer 404 receives masking primitives 310. In an embodiment, masking primitives buffer 404 keeps a record of each triangle and its associations in the form of an array, vector, or any other data structure. Proxy plane initiator 406 may initiate queries on masking primitives buffer 404 using masking primitive query 412, receiving masking primitive query results 414 in return. Masking primitive query 412 and masking primitive query results 414 are described in greater detail below.

Proxy plane initiator 406 associates each triangle with at least one proxy plane. In an embodiment, proxy plane initiator 406 sends masking primitive query 412 to masking primitives buffer 404 requesting the triangle with the largest area. A plane that can be associated to the triangle received in masking primitive query results 414 is then referred to as the first proxy plane. Note that each proxy plane is treated as a one-sided primitive, so a normal is assigned to each proxy plane to keep track of its orientation. This normal may also be used to determine proper associations between proxy planes and triangles in addition to the distance requirements mentioned above. For example, not to limit the present invention, it may be required that a normal of the triangle be oriented consistently with the normal of the proxy plane in order to allow for association. Consistency may be checked by comparing the dot product of the two normals with a user-given threshold. In an embodiment, if the dot product of the two normals is above a user-given threshold, then the triangle and proxy plane are oriented consistently.

A procedure is run by proxy plane initiator 406 to find all triangles that can be associated with the first proxy plane. In an embodiment, proxy plane initiator 406 may send masking primitive query 412 to masking primitives buffer 404 requesting all available triangles. Proxy plane initiator 406 then compares each triangle received with the first proxy plane to determine association based on the requirements mentioned above. Those triangles that can be associated with the first proxy plane, along with an indication of their association, are bundled into masking primitive associations 410. Masking primitive associations 410 is sent to masking primitives buffer 404, which updates association information for those triangles. In an alternate embodiment, not shown, proxy plane initiator 406 sends the properties of the first proxy plane to masking primitives buffer 404, which then initiates the comparisons with its triangles.

Note that it may be desirable to produce proxy textures with as little wasted texture space as possible. To achieve this, an additional requirement may be used to determine association. In an embodiment, all triangles that can be associated to a given proxy plane must be connected in a proximity graph. The vertex set of the proximity graph includes all of the triangles from masking primitives 310, and two triangles are deemed connected by an edge if the distance between them is below a certain threshold. As an example, the threshold may be $(0.4*\epsilon)$. To implement this requirement along with the distance and consistency requirements, a Dijkstra algorithm may be run by either masking primitives buffer 404 or proxy plane initiator 406 using the first proxy plane and the triangle with the largest area as inputs. The Dijkstra algorithm then finds all the triangles connected to the triangle with the largest area that also meet the distance and consistency requirements with respect to the first proxy plane.

Once the first proxy plane has been associated with all possible triangles, proxy plane initiator 406 checks masking primitives buffer 404 to see if all triangles have been associated with the first proxy plane. If all triangles have been associated with the first proxy plane, then the proxy planes are sent to proxy plane optimizer 306 as associated proxy planes 314, and masking primitives buffer 404 sends the triangles and an indication of which proxy plane they are associated with to proxy plane optimizer 306 as associating masking primitives 312. However, if all of the triangles are not associated with the first proxy plane, then proxy plane initiator 406 performs a query to find the triangle that is the longest distance from the current set of proxy planes, or in this case the first proxy plane. In an embodiment, a least squares (L2) error measure is used as the distance measure. This has an advantage of allowing proxy plane initiator 406 to choose large triangles that are far away from a given set of planes as proxy plane candidates. A plane that can be associated to this triangle is then referred to as the second proxy plane and the above process is repeated. If all of the triangles are covered by the first and second proxy planes, then the outputs are sent to proxy plane optimizer 306 as stated above. If some of the triangles are not covered by the first and second proxy planes, then the triangle that is the longest distance from the current set of proxy planes, or in this case the first and second proxy planes, is found and again the above processes are repeated until all triangles have an association with at least one proxy plane.

Note that one or more triangles may be associated with multiple proxy planes. In some instances this may be undesirable, and the description below explains how this may be alleviated.

FIG. 5 is a more detailed diagram of proxy plane optimizer 306. As shown in FIG. 5, proxy plane optimizer 306 includes a masking primitive fitter 502, a new proxy plane generator 504, a proxy plane merger 506, and a proxy plane separator 508.

Masking primitive fitter 502 receives associated masking primitives 312 from masking primitives buffer 404 and associated proxy planes 314 from proxy plane initiator 406. In an embodiment, masking primitive fitter 502 performs a fitting algorithm on each proxy plane's associated triangles. As an example, the fitting algorithm may be completed by solving a least squares optimization problem. This fitting may result in triangles that are no longer associated with the respective proxy plane due to the triangles' position relative to the proxy plane and the other triangles associated with the proxy plane. It may also result in some triangles no longer being associated with any proxy plane. Those triangles that are no longer associated with any proxy plane are sent to new proxy plane generator 504 as unassigned masking primitives 514. Those triangles that are still associated with a proxy plane, along with their updated associations, are sent to proxy plane merger 506 as fitted masking primitives 510. The proxy planes are also sent to proxy plane merger 506 as fitted proxy planes 512.

Proxy plane generator 504 takes unassigned masking primitives 514 and generates new proxy planes 516. In an embodiment, proxy plane generator 504 performs the same algorithm as is described above with respect to FIG. 4 to generate these new proxy planes. The triangles with their new associations are included in assigned masking primitives 518.

Both new proxy planes 516 and assigned masking primitives 518 are sent to proxy plane merger 506.

Proxy plane merger 506 may reduce the number of proxy planes used to create the proxy cloud LOD model. In an embodiment, proxy plane merger 506 finds a first pair of proxy planes from fitted proxy planes 512 that share at least one triangle. A new set of triangles is created from the shared triangles and a new proxy plane is fit to this new set of triangles. As an example, the fitting procedure is the same as is described above with respect to masking primitive fitter 502. The normal of the new proxy plane is then oriented to be consistent with the average of the normals of each proxy plane in the first pair of proxy planes. If the resulting new proxy plane covers all triangles in the new set of triangles after the fitting procedure and normal adjustment, then the new proxy plane is added to the set of proxy planes and both proxy planes in the first pair of proxy planes are discarded. If the resulting new proxy plane does not cover all of the triangles, then no change is made to the set of proxy planes. This process is repeated until each pair of proxy planes that share at least one triangle have been evaluated. In an embodiment, the entire process may be repeated a fixed number of times in order to minimize the number of proxy planes in the set of proxy planes. The set of proxy planes, along with the triangles and any new associations, are sent to proxy plane separator 508 as merged masking primitives 520 and merged proxy planes 522, respectively.

In an embodiment, proxy plane separator 508 improves the mask generation procedure described above with respect to scene renderer 308. Proxy plane separator 508 ensures that each triangle is only associated with one proxy plane. If a triangle is associated with multiple proxy planes, the triangle is assigned to the proxy plane that leads to the smallest maximal error. For example, the triangle may be assigned to the proxy plane that satisfies the distance requirement with the smallest overall error under ε. The triangle is then disassociated from the other proxy planes. After all possible separations are complete, proxy plane separator 508 sends optimized masking primitives 316 and optimized proxy planes 318 to scene renderer 308.

In an alternate embodiment, proxy plane optimizer 306 does not perform any separation and proxy plane separator 508 is skipped. In this case, merged masking primitives 520 and merged proxy planes 522 are sent to scene renderer 308.

In this way, proxy plane optimizer 306 may reduce the number of proxy planes used to create proxy cloud LOD models. This can improve rendering time for client 210, both in terms of data transmission, since fewer data packets need to be sent over network 190, as well as in terms of displaying graphics, since fewer proxy planes need to be assembled to create the proxy cloud LOD model.

Method

Figure 6:
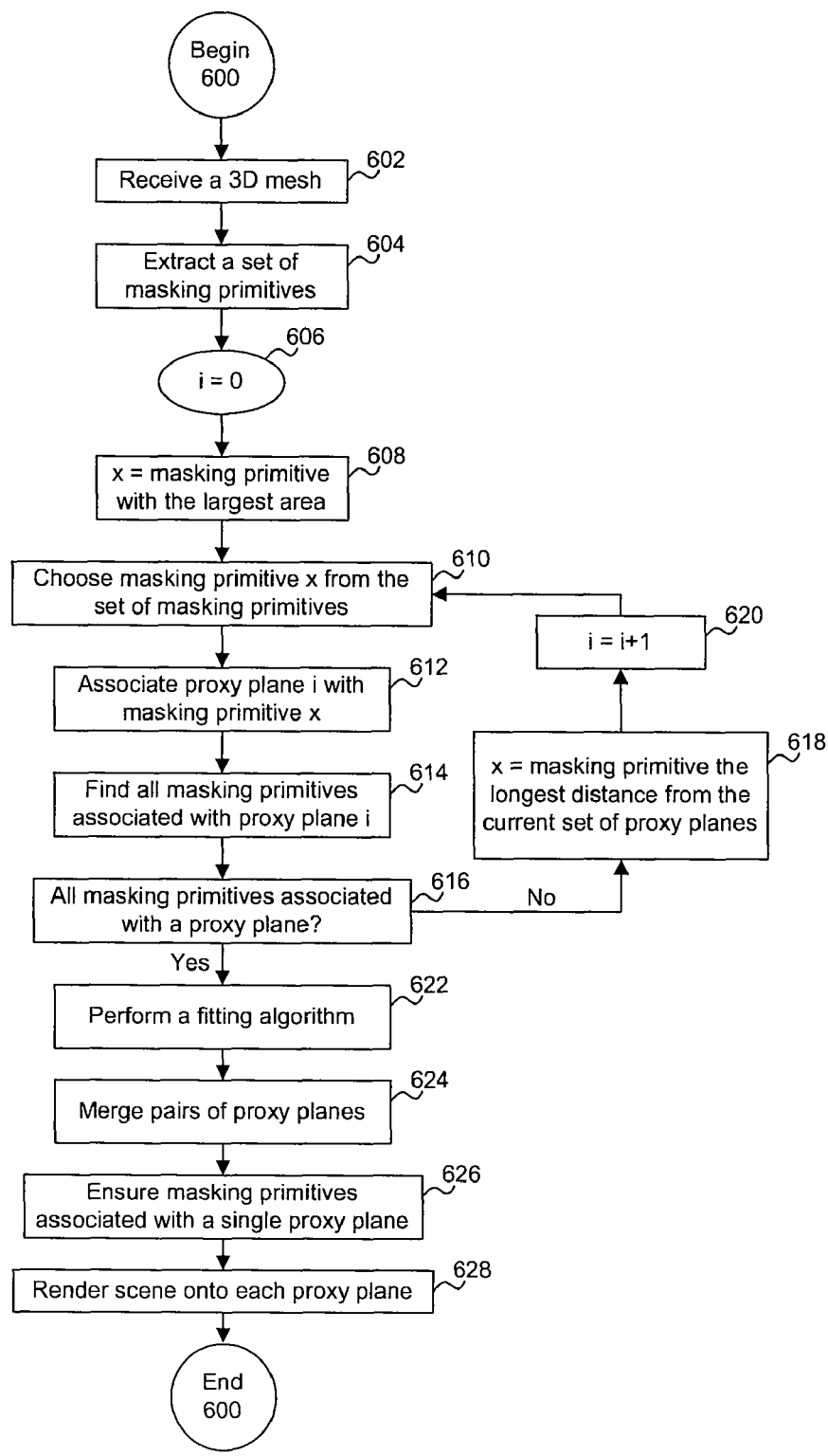
FIG. 6 is a flowchart of a method for using a proxy based approach to generate level of detail according to an embodiment of the present invention.

This section describes a method using a proxy based approach to generate level of detail. FIG. 6 is a flowchart of a method 600 for generating level of detail using a proxy based approach according to an embodiment of the present invention. While method 600 is described with respect to an embodiment of the present invention, method 600 is not meant to be limited and may be used in other applications. In an example, method 600 may be used to determine data that needs to be transmitted to data set merger 104 in FIG. 1. However, method 600 is not meant to be limited to data generation for a data set merger.

As shown in FIG. 6, method 600 begins at stage 602 where a three dimensional polygon mesh is received. In an embodiment, the three dimensional polygon mesh may contain textures. Once stage 602 is complete, method 600 proceeds to stage 604.

At stage 604, a set of masking primitives, or a set of triangles, may be extracted from the three dimensional polygon mesh. In an embodiment, the extraction may be performed in a masking primitive extractor, such as masking primitive extractor 302 of FIG. 3.

Method 600 proceeds to stage 606 once stage 604 is complete. At stage 606, variable i is set to be equal to zero. Once stage 606 is complete, method 600 proceeds to stage 608.

At stage 608, variable x is set to indicate the masking primitive with the largest area. Once stage 608 is complete, method 600 proceeds to stage 610.

At stage 610, the masking primitive indicated by variable x is chosen from the set of masking primitives. Once stage 610 is complete, method 600 proceeds to stage 612.

At stage 612, proxy plane i is associated with masking primitive x. In an embodiment, proxy plane i is the same plane that masking primitive x is positioned within. Once stage 612 is complete, method 600 proceeds to stage 614.

At stage 614, all masking primitives that can be associated with proxy plane i are found. In an embodiment, the distance, consistency, and/or proximity graph requirements described above with respect to FIG. 4 are enabled when determining whether an association between a masking primitive and proxy plane i is valid. Once stage 614 is complete, method 600 proceeds to stage 616.

At stage 616, a check is performed to see if all masking primitives are associated with at least one proxy plane. If all masking primitives are associated with at least one proxy plane, method 600 jumps to stage 622. If all masking primitives are not associated with at least one proxy plane, method 600 proceeds to stage 618.

At stage 618, x is set to indicate the unassigned masking primitive with the longest distance from the current set of proxy planes, consisting of proxy plane 0 through proxy plane i. In an embodiment, the distance may be calculated as a least-squares distance. Once this is complete, method 600 proceeds to stage 620.

At stage 620, i is incremented by one. Once this is complete, method 600 returns to stage 610.

At stage 622, a fitting algorithm is performed on the set of masking primitives associated with each proxy plane. In an embodiment, the fitting algorithm may be completed by solving a least squares optimization problem. Once stage 622 is complete, method 600 continues to stage 624.

At stage 624, pairs of proxy planes that contain at least one similar masking primitive are merged. Stage 624 is described in more detail below with respect to FIG. 7. Once this is complete, method 600 proceeds to stage 626.

At stage 626, masking primitives may be separated from associated proxy planes in order to ensure that each masking primitive is only associated with a single proxy plane. In an embodiment, if a masking primitive is associated with multiple proxy planes, the masking primitive is assigned to the proxy plane that leads to the smallest maximal error. For example, the masking primitive may be assigned to the proxy plane that satisfies the distance requirement with the smallest overall error under ϵ. Once stage 626 is complete, method 600 continues to stage 628.

In an alternate embodiment, method 600 skips stage 626. In this case, method 600 jumps to stage 628 once stage 624 is complete.

At stage 628, a scene is rendered onto each proxy plane. In an embodiment, the scene is composed of the masking primitives associated with the given proxy plane, which form proxy textures. These proxy textures may include color and transparency channels. The scene may be projected onto the given proxy plane using a projection algorithm such as, for example, orthographic projection viewing volume. Once stage 628 is complete, method 600 ends.

Stages 602, 604, 606, 608, 610, 612, 614, 616, 618, 620, 622, 624, 626, and 628 may be implemented as software, hardware, firmware, or any combination thereof.

Figure 7:
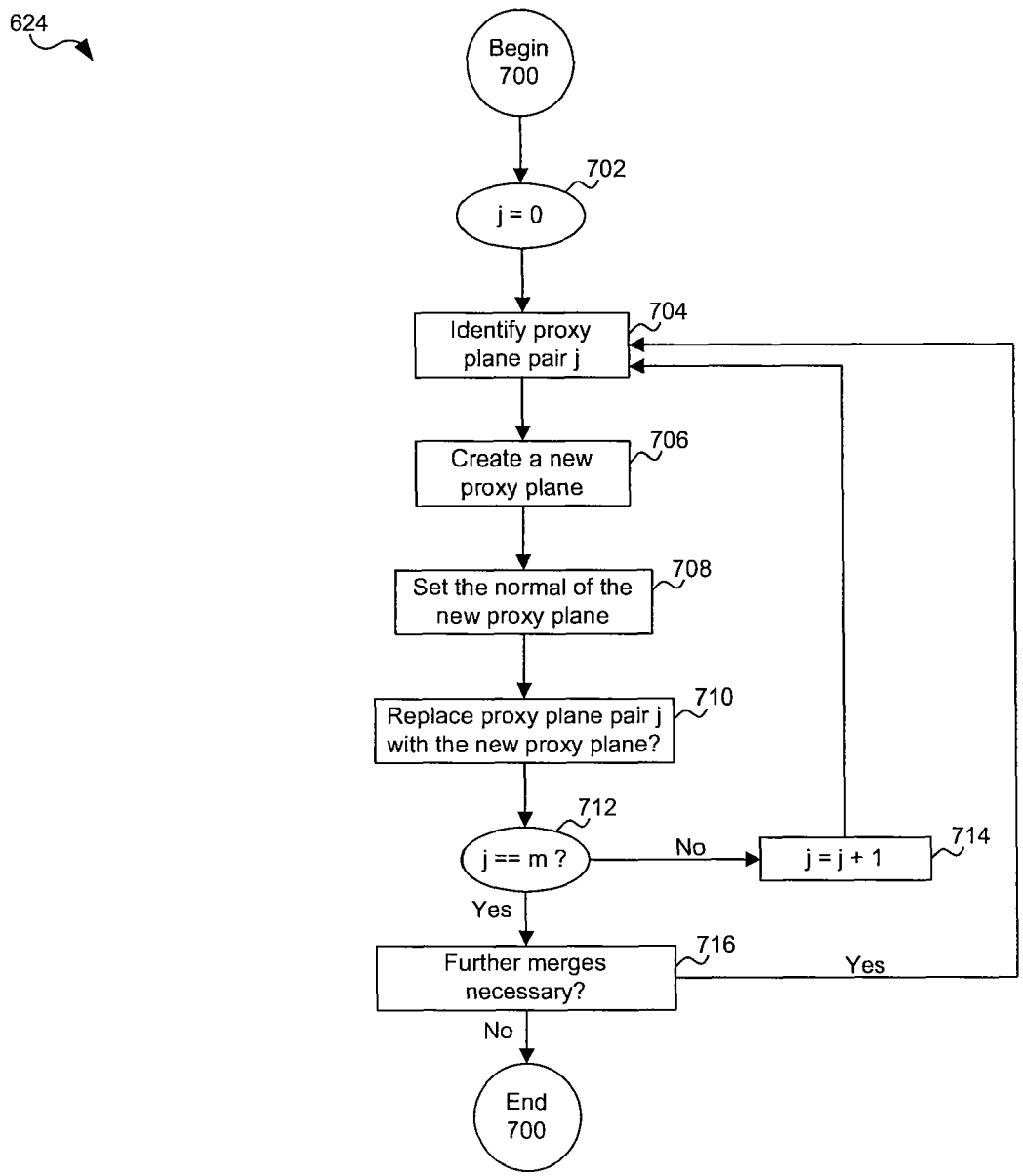
FIG. 7 is a more detailed flowchart of a stage of the method in FIG. 6 according to an embodiment of the present invention.

FIG. 7 is a flowchart of a method 700 for merging pairs of proxy planes according to an embodiment of the present invention. While method 700 is described with respect to an embodiment of the present invention, method 700 is not meant to be limited and may be used in other applications. In an example, method 700 may be used to merge pairs of proxy planes in proxy plane merger 506 from FIG. 5. This method may be implemented during stage 624 of method 600 from FIG. 6. However, method 700 is not meant to be limited to proxy plane merger 506. As shown in FIG. 7, method 700 begins at stage 702 where variable j is set to be equal to zero.

Once stage 702 is complete, method 700 proceeds to stage 704 where proxy plane pair j is identified. In an embodiment, proxy plane pair j is composed of two proxy planes that share at least one masking primitive. Once stage 704 is complete, method 700 proceeds to stage 706.

At stage 706, a new proxy plane is created based on the shared masking primitives. In an embodiment, the new proxy plane is created and fit to the shared masking primitives in the same manner as is described above with respect to FIG. 5. Once this is complete, method 700 proceeds to stage 708.

At stage 708, the normal of the new proxy plane is set. In an embodiment, the normal is oriented to be consistent with an average of the normals of the two proxy planes in proxy plane pair j. Once this is complete, method 700 proceeds to stage 710.

At stage 710, proxy plane pair j may be replaced with the new proxy plane. In an embodiment, proxy plane pair j is replaced by the new proxy plane if the new proxy plane covers all of the masking primitives associated with at least one of the proxy planes from the proxy plane pair j. If the new proxy plane does not cover all of the combined set of masking primitives, then the new proxy plane is discarded, leaving proxy plane pair j unaffected. Once stage 710 is complete, method 700 proceeds to stage 712.

At stage 712, a check is performed to see if j equals m, where m refers to the total number of proxy plane pairs. If j and m are equal, method 700 jumps to stage 716. If j and m are not equal, method 700 proceeds to stage 714.

At stage 714, j is incremented by one. Once this is complete, method 700 returns to stage 704.

At stage 716, a check is performed to see if any further merges are necessary. In an embodiment, further merges may be necessary to further reduce the number of proxy planes that make up a proxy cloud LOD model. If further merges are necessary, method 700 returns to stage 704. If no further merges are necessary, method 700 ends.

Stages 702, 704, 706, 708, 710, 712, 714, and 716 may be implemented as software, hardware, firmware, or any combination thereof.

Figure 8A:
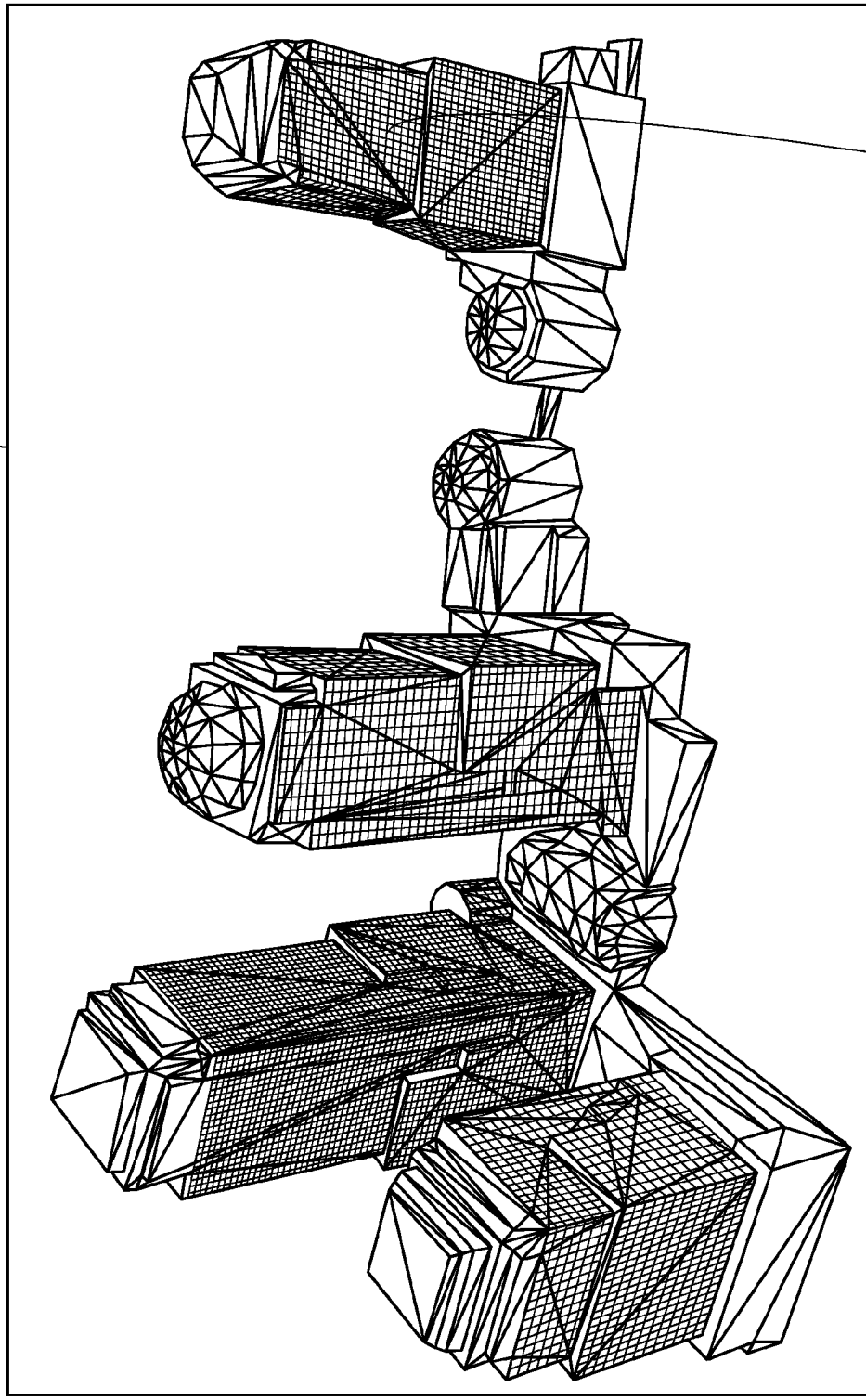
FIGS. 8A-B are example images depicting a proxy based approach to generate level of detail according to an embodiment of the present invention.
Figure 8B:
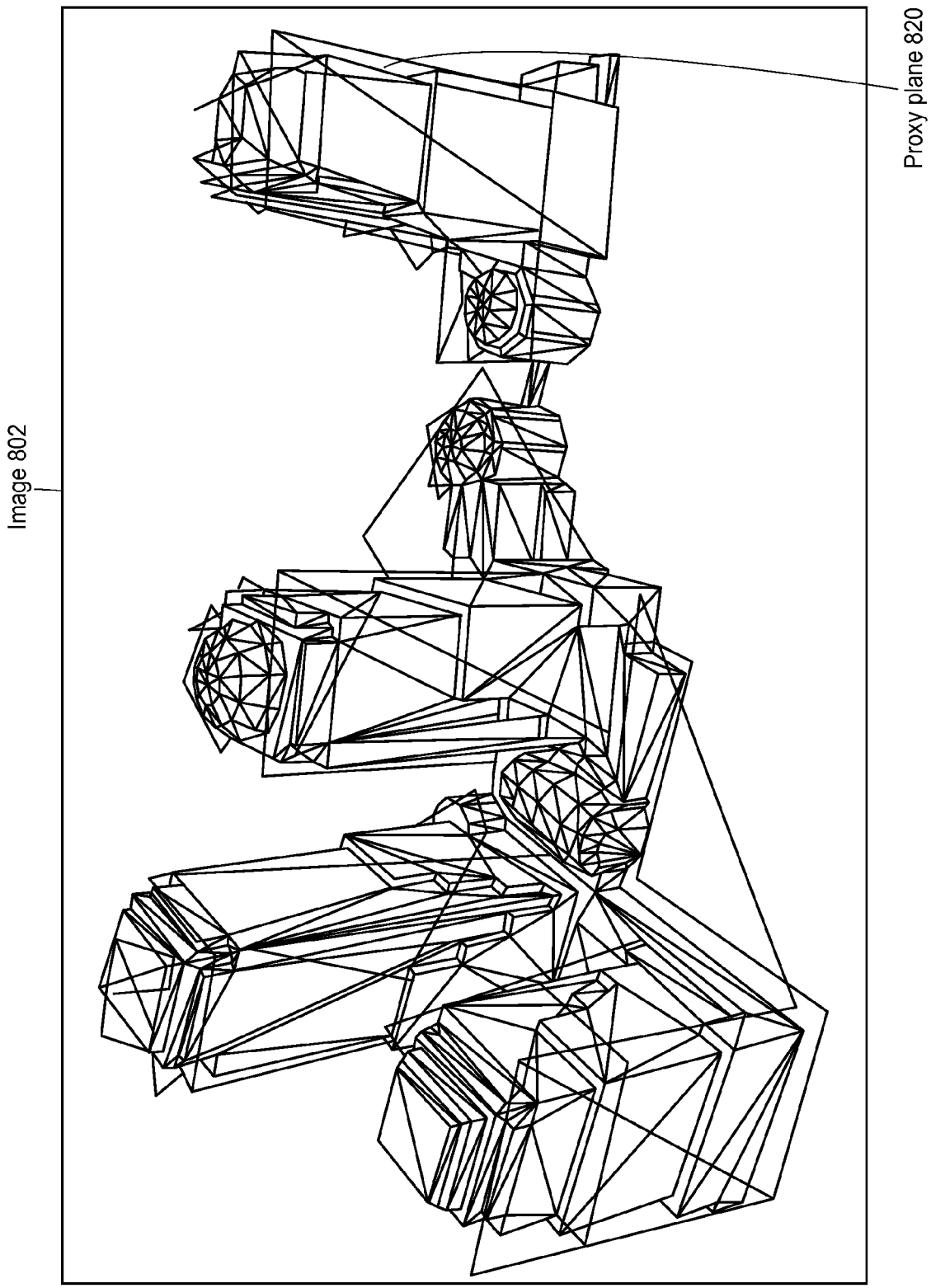

FIGS. 8A-B are example images depicting a proxy based approach to generate level of detail according to an embodiment of the present invention. As an example, FIGS. 8A-B may graphically represent the end result of method 600 of FIG. 6 after the proxy planes have been combined to form one or more proxy cloud LOD models. FIG. 8A shows an image 802. Image 802 includes a set of three dimensional buildings outlined to display the masking primitives used to create each building. In this case, the three dimensional buildings can be considered proxy cloud LOD models. Masking primitive 810 is one example of the masking primitives used to construct the buildings. In this case, all masking primitives are triangular in shape; however this is not a requirement. Note that proxy textures have been projected into the proxy planes associated with the masking primitives. The area within image 802 not displaying a building is transparent. This allows for other proxy cloud LOD models to be created and placed within image 802 without incorrectly masking, distorting, or clipping the buildings and/or other proxy cloud LOD models.

FIG. 8B shows the same image 802, however image 802 now includes the set of three dimensional buildings outlined to display the proxy planes used to create each building. Proxy plane 820 is one example of the proxy planes used to construct the buildings. Many of the proxy planes, such as proxy plane 820, cover area not used to define the buildings. While it may be desirable to minimize as much of this area as possible, it is not a major issue because of the presence of the transparency channels. The transparency allows other proxy planes to overlap the existing proxy planes without causing clipping or other unwanted artifacts.

CONCLUSION

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for generating level of detail (LOD), comprising:
    (1) receiving a three dimensional polygon mesh with textures;
    (2) extracting a set of masking primitives above a first threshold from the three dimensional polygon mesh, wherein the first threshold is a certain size of a masking primitive;
    (3) calculating a set of proxy planes wherein the calculation includes associating each proxy plane with at least one of the masking primitives and wherein the proxy planes combine to form a proxy LOD model; and
    (4) optimizing the set of proxy planes to reduce the set of proxy planes to a smaller number of proxy planes to approximate the proxy LOD model;
    wherein steps (1) to (4) are performed using one or more processors.

2. The method of claim 1, further comprising:
    (5) rendering, using the one or more processors, a scene onto each proxy plane, wherein the scenes are rendered based on the masking primitives associated with the respective proxy plane.

3. The method of claim 1, wherein step (3) comprises associating a proxy plane with a masking primitive if each of a distance from any point on the masking primitive to the proxy plane is below a second threshold and a normal of the proxy plane is consistent with a normal of the masking primitive.

4. The method of claim 3, further comprising determining when the two normals are consistent based on a comparison of a dot product of the two normals and a third threshold.

5. The method of claim 3, wherein step (3) comprises:
    (a) choosing a masking primitive with a largest area from the set of masking primitives, wherein the choosing includes associating a first proxy plane of the set of proxy planes with the masking primitive with the largest area, and wherein the choosing includes ensuring the first proxy plane is within a set distance of the masking primitive with the largest area;
    (b) finding all masking primitives associated with the first proxy plane;
    (c) repeating steps (a) through (b) for a masking primitive a longest distance from the set of proxy planes until all masking primitives are covered by at least one proxy plane.

6. The method of claim 5, wherein step (b) comprises associating a masking primitive with the first proxy plane if each of a distance from any point on the respective masking primitive to the first proxy plane is below the second threshold, a normal of the respective proxy plane is consistent with a normal of the first masking primitive, and the respective masking primitive is connected to the masking primitive with the largest area.

7. The method of claim 6, wherein the associating includes determining whether the respective masking primitive is connected to the masking primitive with the largest area by checking for an existence of a path in a graph whose vertices are masking primitives and whose edges are formed by connecting every pair of masking primitives, the path having a distance below a threshold based on the second threshold.

8. The method of claim 1, wherein step (4) comprises:
    (a) performing, for each proxy plane, a fitting algorithm to best fit masking primitives associated with the respective proxy plane within the respective proxy plane; and
    (b) finding and merging pairs of proxy planes based on their associated masking primitives.

9. The method of claim 8, further comprising:
    (c) separating masking primitives from proxy planes such that each masking primitive belongs to a single proxy plane.

10. The method of claim 8, wherein step 4(b) comprises:
    (i) identifying a first pair of proxy planes that share at least one masking primitive;
    (ii) creating a new proxy plane that includes the at least one shared masking primitive using the fitting algorithm;

(iii) setting a normal of the new proxy plane based on an average of normals of each proxy plane in the first pair of proxy planes; and (iv) if the new proxy plane covers all of the at least one shared masking primitive, replacing the first pair of proxy planes with the new proxy plane.

11. The method of claim 10, further comprising:

(v) repeating steps (i) through (iv) for each pair of proxy planes that share at least one masking primitive; and (vi) repeating steps (i) through (v) several times to further merge proxy planes.

12. The method of claim 8, wherein the fitting algorithm is based on solving a least squares optimization problem.

13. The method of claim 2, wherein step (5) comprises:

(a) rendering, for each proxy plane, a mask at a given resolution containing the scene based on the masking primitives associated with the respective proxy plane; and (b) projecting, for each proxy plane, the respective mask onto the respective proxy plane using an orthographic projection viewing volume.

14. A system for generating level of detail, comprising:

a processor; and a memory for storing instructions that when executed by the processor cause the system to implement:

a masking primitive extractor, that receives a three dimensional polygon mesh with textures, and that extracts a set of masking primitives above a first threshold from the three dimensional polygon mesh, wherein the first threshold is a certain size of a masking primitive;

a proxy plane calculator, that calculates a set of proxy planes, wherein each proxy plane is associated with at least one of the masking primitives and wherein the proxy planes combine to form a proxy level of detail (LOD) model; and a proxy plane optimizer, that optimizes the set of proxy planes to reduce the set of proxy planes to a smaller number of proxy planes to approximate the proxy LOD model.

15. The system of claim 14, wherein the memory is further for storing instructions that when executed by the processor cause the system to implement:

a scene renderer, that renders a scene onto each proxy plane, wherein the scenes are based on the masking primitives associated with the respective proxy plane.

16. The system of claim 14, wherein any proxy plane is associated with any masking primitive if each of a distance from any point on the respective masking primitive to the respective proxy plane is below a second threshold and a normal of the respective proxy plane is consistent with a normal of the respective masking primitive.

17. The system of claim 16, wherein consistency is determined based on a comparison of a dot product of the two normals and a third threshold.

18. The system of claim 16, wherein the proxy plane calculator comprises:

a masking primitives buffer, that chooses a masking primitive with a largest area from the set of masking primitives, wherein a first proxy plane of the set of proxy planes is associated with the masking primitive with the largest area, and wherein the first proxy plane is within a set distance of the masking primitive with the largest area; and a proxy plane initiator, that finds all masking primitives associated with the first proxy plane, wherein the proxy plane initiator and the masking primitives buffer ensure that all masking primitives are covered by at least one proxy plane.

19. The system of claim 18, wherein a masking primitive is associated with the first proxy plane if each of a distance from any point on the respective masking primitive to the first proxy plane is below the second threshold, a normal of the respective proxy plane is consistent with a normal of the first masking primitive, and the respective masking primitive is connected to the masking primitive with the largest area.

20. The system of claim 19, wherein if there exists a path in a graph whose vertices are masking primitives and whose edges are formed by connecting every pair of masking primitives that has a distance below a threshold based on the second threshold, the respective masking primitive is connected to the masking primitive with the largest area.

21. The system of claim 14, wherein the proxy plane optimizer comprises:

a masking primitive fitter, that performs, for each proxy plane, a fitting algorithm to best fit masking primitives associated with the respective proxy plane within the respective proxy plane; and a proxy plane merger, that finds and merges pairs of proxy planes based on their associated masking primitives.

22. The system of claim 21, further comprising:

a proxy plane separator, that separates masking primitives from proxy planes such that each masking primitive belongs to a single proxy plane.

23. The system of claim 21, wherein the fitting algorithm is based on a solution to a least squares optimization problem.

24. A computer implemented method for merging pairs of proxy planes, comprising:

(1) identifying a first pair of proxy planes that share at least one masking primitive;

(2) creating a new proxy plane that includes the at least one shared masking primitive using the fitting algorithm;

(3) setting a normal of the new proxy plane based on an average of normals of each proxy plane in the first pair of proxy planes; and (4) replacing the first pair of proxy planes with the new proxy plane if the new proxy plane covers all of the at least one shared masking primitive;

wherein steps (1) to (4) are performed using one or more processors.

25. The method of claim 24, further comprising:

(5) repeating steps (1) through (4) for each pair of proxy planes that share at least one masking primitive; and (6) repeating steps (1) through (5) several times to further merge proxy planes.

* * * * *